US010673813B2

(12) United States Patent
Hang et al.

(10) Patent No.: US 10,673,813 B2
(45) Date of Patent: Jun. 2, 2020

(54) METHOD FOR NAT TRAVERSAL IN VPN (71) Applicant: National Chiao Tung University, Hsinchu (TW)

(72) Inventors: Hsueh Ming Hang, Hsinchu (TW); Shaw Hwa Hwang, Hsinchu (TW); Cheng Yu Yeh, Hsinchu (TW); Bing Chih Yao, Hsinchu (TW); Kuan Lin Chen, Hsinchu (TW); Yao Hsing Chung, Hsinchu (TW); Shun Chieh Chang, Hsinchu (TW); Chi Jung Huang, Hsinchu (TW); Li Te Shen, Hsinchu (TW); Ning Yun Ku, Hsinchu (TW); Tzu Hung Lin, Hsinchu (TW); Ming Che Yeh, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 240 days.

(21) Appl. No.: 15/886,043

(22) Filed: Feb. 1, 2018

(65) Prior Publication Data

US 2019/0238503 A1     Aug. 1, 2019

(51) Int. Cl.
*H04L 29/12*     (2006.01)
*H04L 12/46*     (2006.01)

(52) U.S. Cl.
CPC ........ *H04L 61/256* (2013.01); *H04L 12/4641* (2013.01); *H04L 61/2514* (2013.01); *H04L 61/2517* (2013.01); *H04L 61/2592* (2013.01)

(58) Field of Classification Search
CPC .............. H04L 61/256; H04L 61/2514; H04L 61/2592; H04L 12/4641
USPC .................................................. 709/228, 245
See application file for complete search history.

(56) References Cited

U.S. PATENT DOCUMENTS

| 9,088,546 | B2 * | 7/2015 | Tjahjono ............... H04L 63/164 |
| 2007/0058644 | A1 | 3/2007 | Brahmbhatt et al. |
| 2013/0318345 | A1 * | 11/2013 | Hengeveld .......... H04L 12/4633 713/168 |
| 2014/0280989 | A1 * | 9/2014 | Borkowski ........... H04L 67/104 709/228 |

* cited by examiner

*Primary Examiner* — Zi Ye
(74) *Attorney, Agent, or Firm* — Bacon & Thomas, PLLC (57) ABSTRACT

The present invention provides a method for NAT traversal in VPN so that the VPN can detect the rule of port allocation for NAT outside the VPN to achieve NAT traversal. The communication structure according to the present invention includes a public network, a client network, a destination network, a first NAT, a second NAT. A DNAT-T proxy server is installed between the first NAT and the second NAT and has the function for the VPN to conduct a plurality of (N times) registrations before sending data out to detect the rule for NAT port allocation of the DNAT-T proxy server, and then inform the next NAT port allocation to the other side of the VPN so as to achieve NAT traversal for the data packets in VPN.

1 Claim, 7 Drawing Sheets

METHOD FOR NAT TRAVERSAL IN VPN

FIELD OF THE INVENTION

The present invention relates to a method for NAT (Network Address Translator) traversal, and more particularly to a method for NAT traversal in VPN (Virtual Private Network) to enable VPN to traverse NAT by a public network without blocking.

BACKGROUND OF THE INVENTION

A virtual private network (VPN) extends a private network across a public network (such as an Internet), and enables users to send and receive data across shared or public network as if their computing devices were directly connected to the private network.

Figure 1:
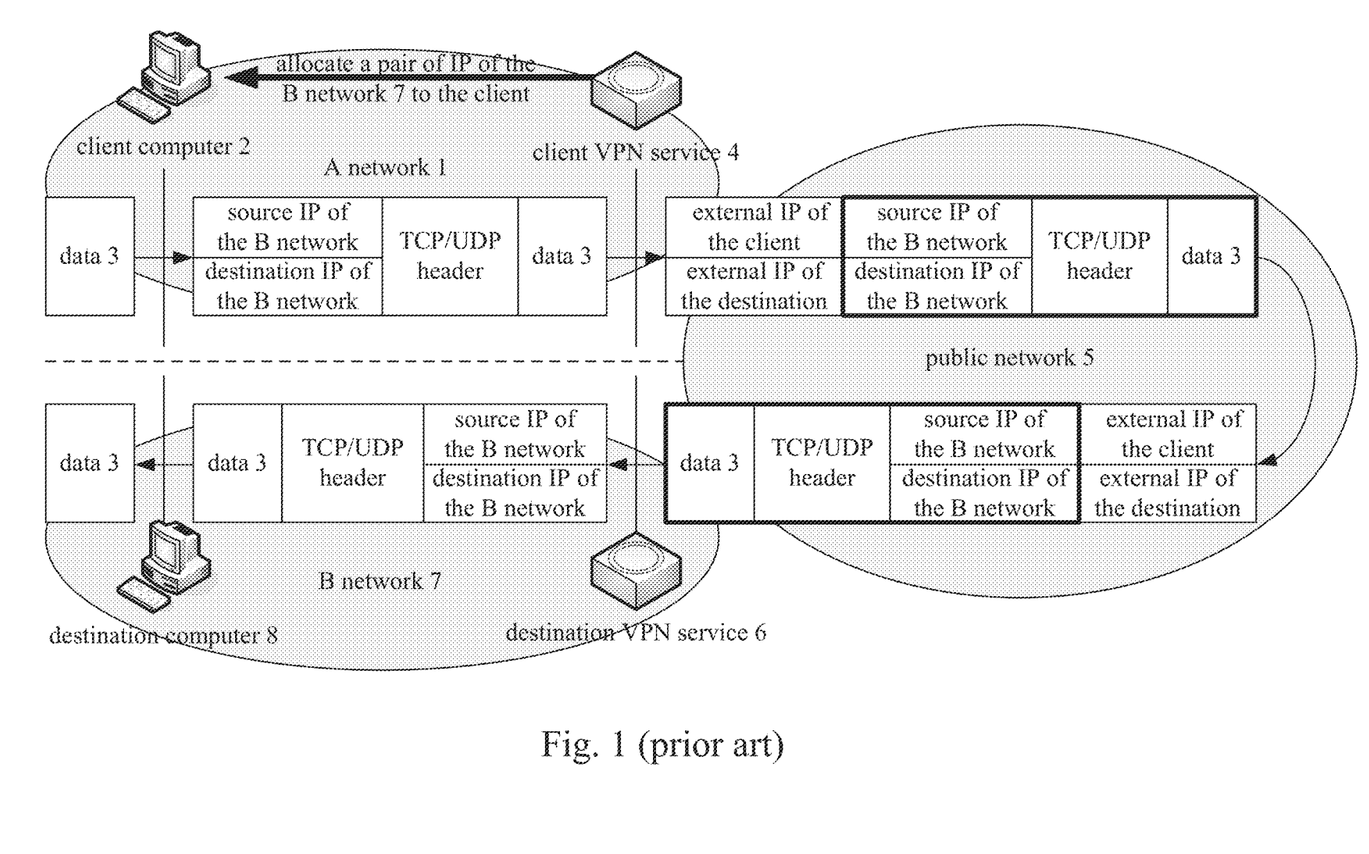
FIG. 1 shows schematically a diagram for VPN to send data by a public network.

Referring to FIG. 1, which is a schematic diagram for VPN to send data by a public network. A client computer 2 in A network 1 is going, to send data 3 through a client VPN service 4, a public network 5 (for instance an Internet), a destination VPN service 6 to a destination computer 8 in B network 7.

Before the data 3 sent from A network 1 through the client VPN service 4, the client VPN service 4 will first allocate a pair of IP of the B network 7 to the client computer 2, therefore two sets of message will be added after the data 3, the first message is a TCP/UDP header, the second message includes a source IP of the B network and a destination IP of the B network. TCP means Transmission Control Protocol, UDP means User Datagram Protocol.

As the data 3 is sent to the public network 5, a third message will be added after the second message, i.e. an external IP of the client and an external IP of the destination, which are allocated by the public network 5 to the client VPN service 4 and the destination VPN service 6 respectively.

After the data 3 is sent by the public network 5 through the destination VPN service 6 to the B network 7, the external IP of the client and the external IP of the destination are peeled off so that the rest of the data 3 are sent to the destination computer 8.

In the present Internet environment, more and more users install NAT (Network Address Translator) servers. Network address translation (NAT) works as a firewall, and is a technique of remapping a source IP address of an IP packet into another while transiting across a network.

Figure 2:
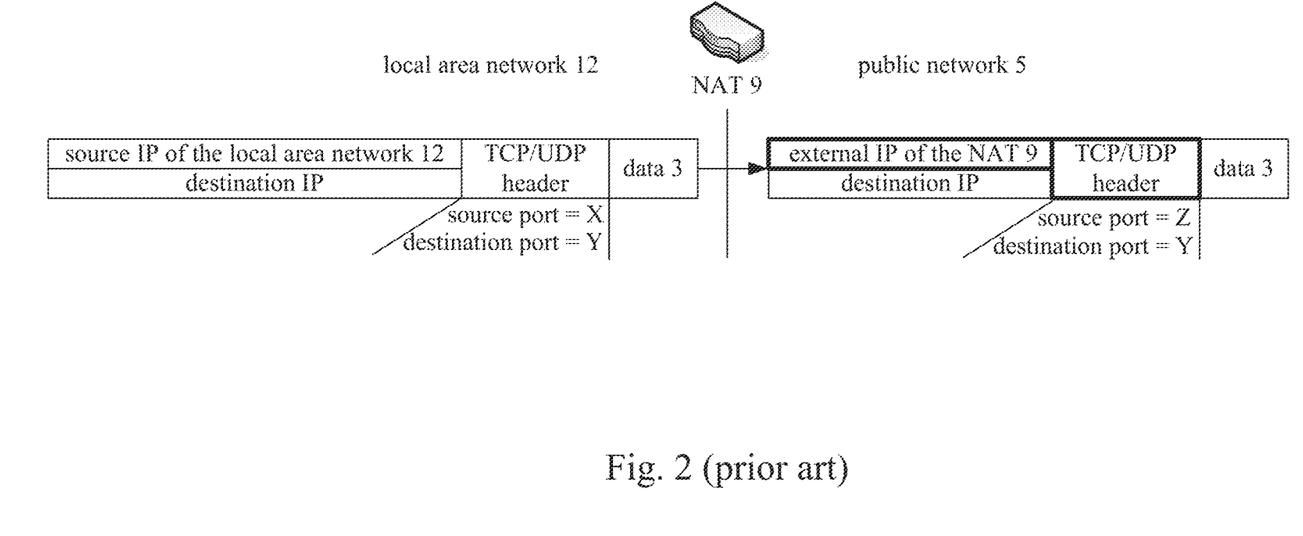
FIG. 2 shows schematically an NAT is installed between the public network and a local area network.

Referring to FIG. 2, if an NAT 9 is installed between the public network 5 and a local area network 12, when the data 3 is sent from the local area network 12, the source IP of the local area network 12 will be amended by the NAT 9 to the external IP of the NAT 9, and the source port X will be amended to Z by the NAT 9.

Figure 3:
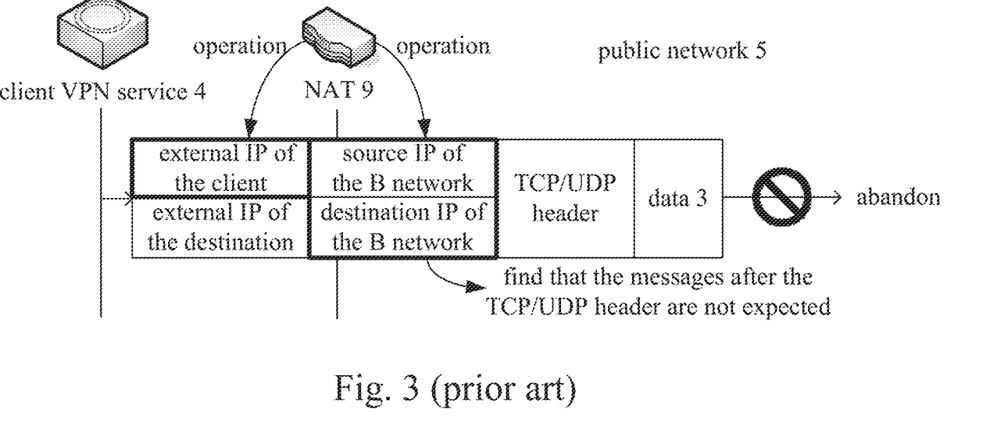
FIG. 3 shows schematically the NAT is installed between the public network and a client VPN service.

Referring to FIG. 3, if the NAT 9 is installed between the public network 5 and the client VPN service 4, when the data 3 is sent out from the client VPN service 4, the NAT 9 finds that the two sets of message after the TCP/UDP header are not so simple as those of the FIG. 2 to identify, and cannot to amend it to the external IP of the NAT 9, so an abandonment will be processed so as to destroy the continuation of the data.

Figure 4:
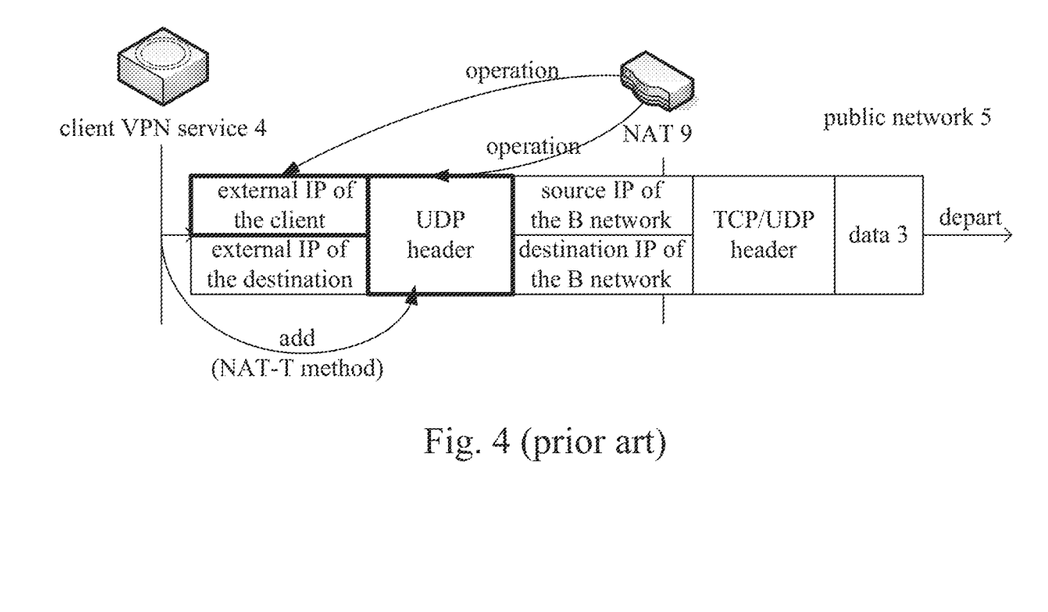
FIG. 4 shows schematically the NAT-T method.

There is an easy method to solve the problem in FIG. 3, as shown in FIG. 4, when the data 3 is sent out from the client VPN service 4, an extra UDP header is added after the two sets of message of the data 3, and an external IP of the client and an external IP of the destination are added after the extra UDP header, so the NAT 9 can amend the external IP of the client to an external IP of the NAT 9, and the data 3 can be passed through the public network 5 to arrive the destination VPN service 6. This is called an NAT-T (NAT-Traversal) method.

Figure 5:
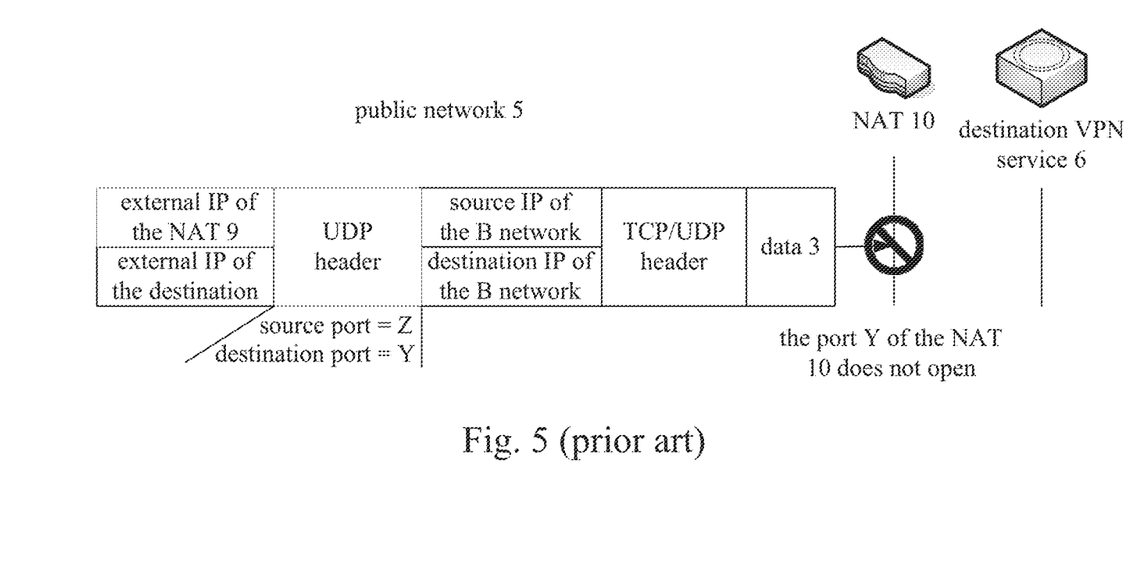
FIG. 5 shows schematically that an NAT is installed at the outside of the destination VPN service.

Referring to FIG. 5, if an NAT 10 is installed at the outside of the destination VPN service 6, since the destination VPN service 6 is arranged to receive data, there is no packet to be sent from the destination VPN service 6 to NAT 10, the port Y of the NAT 10 will not open to receive any data, so the data 3 is blocked by the NAT 10.

SUMMARY OF THE INVENTION

The object of the present invention is to provide a method for NAT traversal in VPN so that the VPN can detect the rule of port allocation for NAT outside the VPN to achieve NAT traversal.

In a structure of network communication according to the present invention, comprising a public network, a client network and a destination network; a first NAT is installed between a client VPN service and the public network, a second NAT is installed between a destination VPN service and the public network; a DNAT-T (Dual NAT-Traversal) proxy server is installed between the first NAT and the second NAT, having a function for enabling the client VPN service to send a data to the destination VPN service and being able to traverse the first NAT and the second NAT, comprising steps as below:

Both the client VPN service and the destination VPN service conduct registration to the DNAT-T proxy server by sending a Register packet respectively to the DNAT-T proxy server, then the DNAT-T proxy server responds respectively with a Register ACK to the client VPN service and the destination the VPN service;

when the client VPN service wants to transit the data to the destination VPN service, the client VPN service sends an NAT Test packet to the DNAT-T proxy server, then the DNAT-T proxy server responds with a Response NAT $(IP_A:P_{A1})$ to inform that an external IP of the client of the first NAT is $IP_A$, and its port is $P_{A1}$;

detecting in this way for N times so as to obtain a rule for port allocation of the first NAT, and predict that the next port allocation is $IP_A:P_{An+1}$;

thereafter the client VPN service sends a Tell $(IP_A:P_{An+1})$ through the previous registration channel of the client VPN service to the DNAT-T proxy server, and then the DNAT-T proxy server sends the Tell $(IP_A:P_{An+1})$ through the previous registration channel of the destination VPN service to the destination VPN service;

after the destination VPN service receives the Tell $(IP_A:P_{An+1})$, N times of NAT Test are conducted similarly to obtain the next port allocation $IP_B:P_{Bn+1}$;

thereafter the destination VPN service sends a Tell ACK $(IP_B:P_{Bn+1})$ through the previous registration channel of the destination VPN service to the DNAT-T proxy server, and then the DNAT-T proxy server sends the Tell ACK $(IP_A:P_{An+1})$ through the previous registration channel of the client VPN service to the client VPN service, at the same time the DNAT-T proxy server also sends a SYNCsignal to the destination VPN service;

when the client VPN service receives the $IP_B:P_{Bn+1}$ message, a traversal is being conducted, data is sent directly to $IP_B:P_{Bn+1}$ when the destination VPN service receives the SYNC signal, a traversal is also being conducted, data is sent directly to $IP_A:P_{An+1}$; a bilateral data traversal channel through the first NAT and the second NAT is therefore achieved.

After the bilateral data traversal channel is achieved, the client VPN service sends the data, and four sets of message will be added after the data, the first is a TCP/UDP header, the second includes a source IP of the destination network and a destination IP of the destination network, the third is an extra UDP header, the fourth includes an external IP of the client and an external IP of the destination, therefore the first NAT can amend the external IP of the client to an external IP of the first NAT, and the data can be passed through the first NAT, the public network and the second NAT to arrive the destination VPN service.

DETAILED DESCRIPTIONS OF THE PREFERRED EMBODIMENTS

Figure 6:
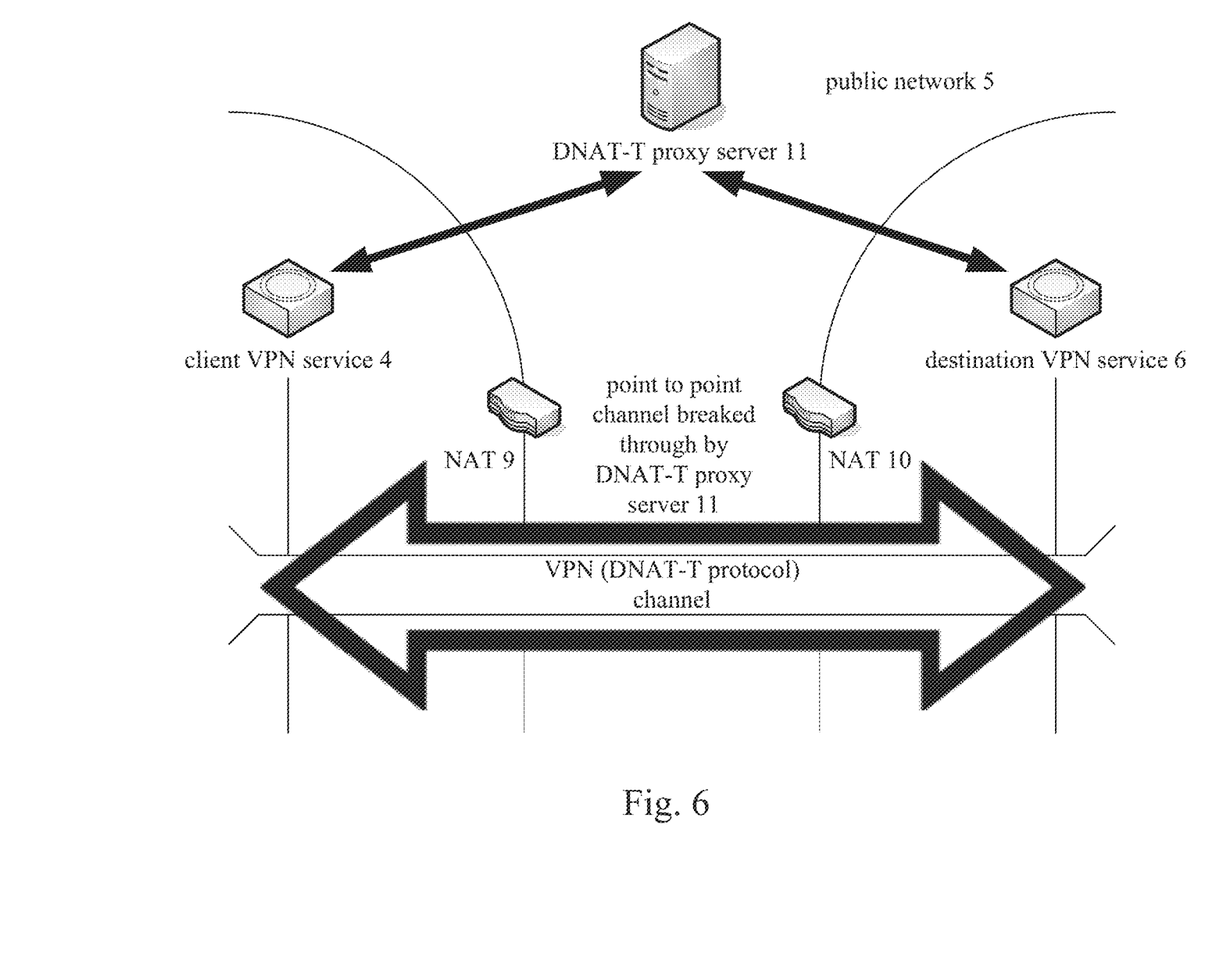
FIG. 6 shop shows schematically the communication structure of the method for NAT traversal in VPN according to the present invention.

Referring to FIG. 6, which shows schematically the communication structure of the method for NAT traversal in VPN according to the present invention. DNAT-T (Dual NAT Traversal) proxy server 11 is arranged in the public network 5 for facing an environment of a client VPN service 4, an NAT 9, an NAT 10 and a destination VPN service 6 to break through the VPN channel, so the data can be passed directly through the client VPN service 4 and the destination VPN service 6.

Figure 7:
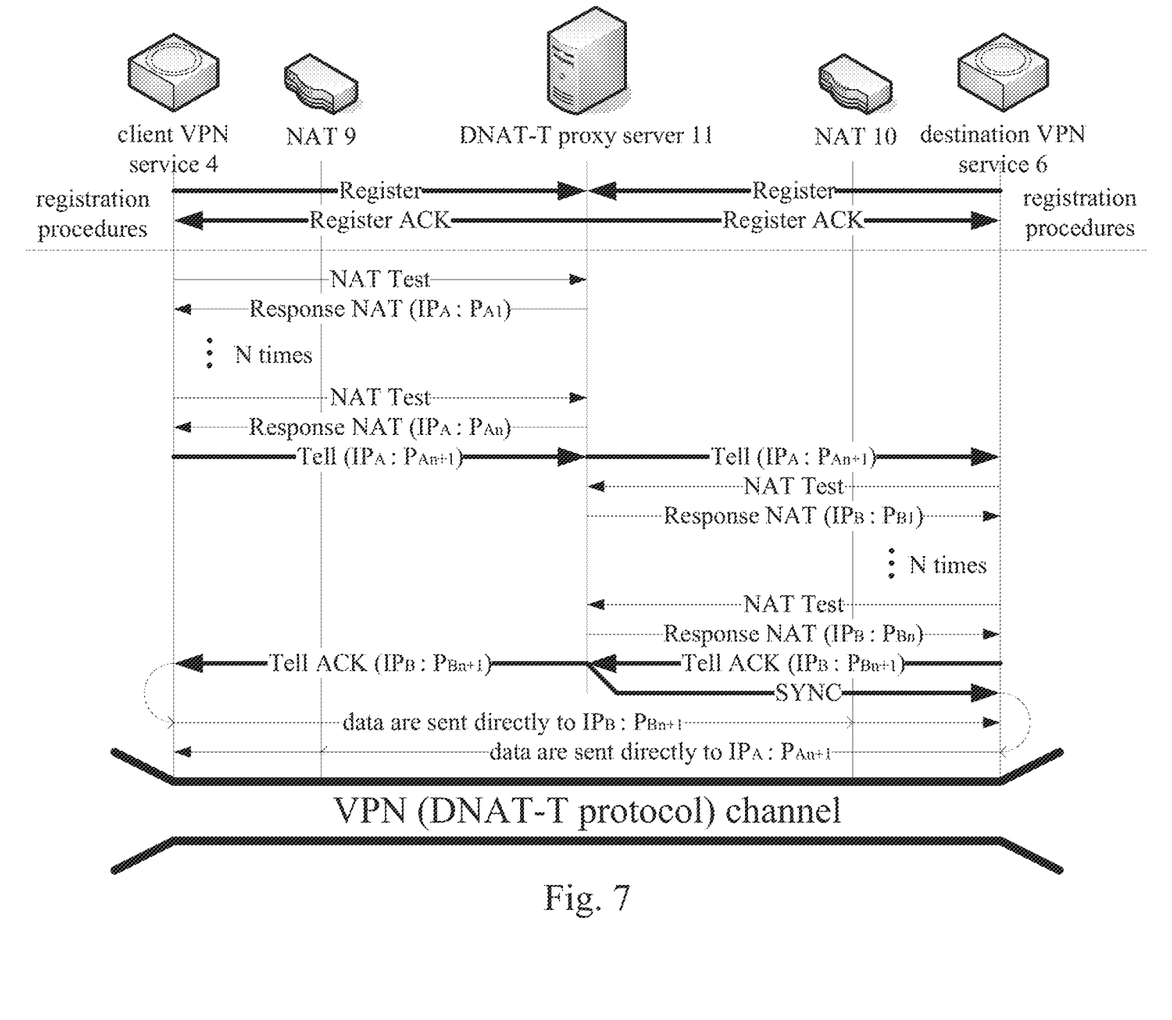
FIG. 7 describes the DNAT-T protocol according to the present invention.

Referring to FIG. 7, which describes the DNAT-T protocol according to the present invention. The DNAT-T (Dual NAT Traversal) proxy server 11 stores the related software program of the DNAT-T protocol according to the present invention for processing the data communication between the client VPN service 4 and the destination VPN service 6.

Before the data 3 is sent by the client VPN service 4, a plurality of (N times) registrations have to be conducted to detect the rule for port allocation of the DNAT-T proxy server 11. After N times of registration, the client VPN service 4 can predict the next port allocation of the DNAT-T proxy server 11 for sending out data 3.

Firstly, both the client VPN service 4 and the destination VPN service 6 conduct registration to the DNAT-T proxy server 11 by sending a Register packet respectively to the DNAT-T proxy server 11, then the DNAT-T proxy server 11 responds respectively with a Register ACK to the client VPN service 4 and the destination the VPN service 6 in order to guarantee a free communication channel between the DNAT-T proxy server 11 and the bilateral VPN services.

When the client VPN service 4 wants to connect with the destination VPN service 6, the client VPN service 4 sends an NAT Test packet to the DNAT-T proxy server 11, then the DNAT-T proxy server 11 responds with a Response NAT $(IP_A:P_{A1})$ to inform that the external IP of the client of the NAT 9 is $IP_A$, and its port is $P_{A1}$.

Detecting in this way for N times so as to obtain the rule for port allocation of the NAT 9, and predict that the next port allocation is $IP_A:P_{An+1}$.

Thereafter the client VPN service 4 sends a Tell $(IP_A: P_{An+1})$ through the previous registration channel of the client VPN service 4 to the DNAT-T proxy server 11, and then the DNAT-T proxy server 11 sends the Tell $(IP_A:P_{An+1})$ through the previous registration channel of the destination VPN service 6 to the destination VPN service 6.

After the destination VPN service 6 receives the Tell $(IP_A:P_{An+1})$ message, N times of NAT Test are conducted similarly to obtain the next port allocation $IP_B:P_{Bn+1}$.

Thereafter the destination VPN service 6 sends a Tell ACK($IP_B: P_{Bn+1}$, through the previous registration channel of the destination VPN service 6 to the DNAT-T proxy server 11, and then the DNAT-T proxy server 11 sends the Tell ACK($IP_B: P_{Bn+1}$) through the previous registration channel of the client VPN service 4 to the client VPN service 4, at the same time the NAT-T proxy server 11 also sends a SYNCsignal to the destination VPN service 6.

When the client VPN service 4 receives $IP_B:P_{Bn+1}$ message, a traversal is being conducted, the data 3 is sent directly to $IP_B:P_{Bn+1}$. When the destination VPN service 6 receives the SYNC signal, a traversal is also being conducted, the data 3 is sent directly to $IP_A:P_{An+1}$. Therefore a bilateral data traversal channel through NAT 9 and NAT 10 is achieved.

Thereafter the NAT-T method shown in FIG. 4 is implemented on the bilateral data traversal channel so as to solve the problem that the bilateral VPN services are both under the NAT.

The scope of the present invention depends upon the following claims, and is not limited by the above embodiments.

What is claimed is:

1. A method for NAT traversal in VPN, in a structure of network communication, comprising a public network, a client network and a destination network; the client network and the destination network transit a data through the public network by using a client VPN service and a destination VPN service respectively; a first NAT is installed between the client VPN service and the public network, a second NAT is installed between the destination VPN service and the public network; a DNAT-T proxy server is installed between the first NAT and the second NAT, having a function for enabling the client VPN service to send the data to the destination VPN service and being able to traverse the first NAT and the second NAT, comprising steps as below:

(a) both the client VPN service and the destination VPN service conduct registration to the DNAT-T proxy server by sending a Register packet respectively to the DNAT-T proxy server, then the DNAT-T proxy server responds respectively with a Register ACK to the client VPN service and the destination the VPN service;

(b) when the client VPN service wants to transit the data to the destination VPN service, the client VPN service sends an NAT Test packet to the DNAT-T proxy server, then the DNAT-T proxy server responds with a Response NAT $(IP_A: P_{A1})$ to inform that an external IP of the client of the first NAT is $IP_A$, and its port is $P_{A1}$;

(c) detecting in this way for N times so as to obtain a rule for port allocation of the first NAT, and predict that a next port allocation is $IP_{A:\ PAn+1}$;

(d) thereafter the client VPN service sends a Tell $(IP_A: P_{An+1})$ through the registration channel of the client VPN service in step (a) to the DNAT-T proxy server, and then the DNAT-T proxy server sends the Tell $(IP_A:$ $P_{An+1}$) through the registration channel of the destination VPN service in step (a) to the destination VPN service;

(e) after the destination VPN service receives the Tell ($IP_A$: $P_{An+1}$), N times of NAT Test are conducted similarly to the DNAT-T proxy server to obtain a next port allocation $IP_B$:$P_{Bn+1}$;

(f) thereafter the destination VPN service sends a Tell ACK($IP_B$: $P_{Bn+1}$) through the registration channel of the destination VPN service in step (a) to the DNAT-T proxy server, and then the DNAT-T proxy server sends the Tell ACK($IP_B$: $P_{Bn+1}$) through the registration channel of the client VPN service in step (a) to the client VPN service, at the same time the NAT-T proxy server also sends a SYNCsignal to the destination VPN service;

(g) when the client VPN service receives the IPB: PBn+1 message, traversal is being conducted, data is sent directly to IPB: PBn+1; when the destination VPN service receives the SYNC signal, traversal is also being conducted, data is sent directly to IPA: PAn+1; a bilateral data traversal channel through the first NAT and the second NAT is therefore achieved; and (h) the client VPN service sends the data, and four sets of message will be added after the data, wherein set a first is a TCP/UDP header, a second set includes a source IP of the destination network and a destination IP of the destination network, a third set is an extra UDP header and a fourth set includes an external IP of the client and an external IP of the destination, whereby the first NAT can amend the external IP of the client to an external IP of the first NAT, and the data can be passed through the first NAT, the public network and the second NAT to arrive the destination VPN service.

* * * * *